United States Patent
Case et al.

(10) Patent No.: US 10,331,219 B2
(45) Date of Patent: Jun. 25, 2019

(54) IDENTIFICATION AND USE OF GESTURES IN PROXIMITY TO A SENSOR

(71) Applicant: Lenovo (Singapore) Pte. Ltd., Singapore (SG)

(72) Inventors: Michaela Rose Case, Raleigh, NC (US); Aaron Michael Stewart, Raleigh, NC (US); Wesley Abram Luttrell, Raleigh, NC (US); Mamoru Okada, Kanagawa-ken (JP); Xin Feng, Arcadia, CA (US)

(73) Assignee: Lenovo (Singaore) Pte. Ltd., Singapore (SG)

( * ) Notice: Subject to any disclaimer, the term of this patent is extended or adjusted under 35 U.S.C. 154(b) by 321 days.

(21) Appl. No.: 13/734,463

(22) Filed: Jan. 4, 2013

(65) Prior Publication Data
US 2014/0191972 A1    Jul. 10, 2014

(51) Int. Cl.
    *G06F 3/01*     (2006.01)
    *G06F 3/02*     (2006.01)
    *G06F 3/0488*   (2013.01)
    *G06F 3/0489*   (2013.01)

(52) U.S. Cl.
    CPC ............ *G06F 3/017* (2013.01); *G06F 3/0213* (2013.01); *G06F 3/0489* (2013.01); *G06F 3/04883* (2013.01)

(58) Field of Classification Search
    CPC .................................................. G06F 3/0213
    See application file for complete search history.

(56) References Cited

U.S. PATENT DOCUMENTS

| | | | | |
|---|---|---|---|---|
| 8,928,590 B1 * | 1/2015 | El Dokor | | G06F 3/0233 345/168 |
| 2004/0189508 A1 * | 9/2004 | Nguyen | | 341/176 |
| 2007/0130547 A1 | 6/2007 | Boillot | | |
| 2010/0095206 A1 | 4/2010 | Kim | | |
| 2010/0100854 A1 | 4/2010 | Russell et al. | | |
| 2010/0148995 A1 * | 6/2010 | Elias | | G06F 3/0488 341/22 |
| 2010/0149099 A1 * | 6/2010 | Elias | | G06F 1/1616 345/168 |

(Continued)

FOREIGN PATENT DOCUMENTS

| | | |
|---|---|---|
| CN | 102713822 A | 10/2012 |
| WO | 2012140593 A2 | 10/2012 |

OTHER PUBLICATIONS

Search Report Under Section 17 of the Patents Act 1977 for Application No. GB1320620.6, Apr. 28, 2014, 2 pages, South Wales, United Kingdom.

*Primary Examiner* — Amr A Awad
*Assistant Examiner* — Maheen I Javed
(74) *Attorney, Agent, or Firm* — Ference & Associates LLC

(57) ABSTRACT

An aspect provides a method, including: operating one or more sensors to detect gesture input proximate to a surface of an input device of an information handling device, wherein the input device is configured to receive one or more input types in addition to gesture input; determining, using a processor, if the gesture input detected matches a predetermined gesture; and executing at least one response action associated with the predetermined gesture. Other aspects are described and claimed.

21 Claims, 10 Drawing Sheets

(56) References Cited

U.S. PATENT DOCUMENTS

| | | | |
|---|---|---|---|
| 2010/0259482 A1* | 10/2010 | Ball | G06F 3/0219 345/168 |
| 2011/0128164 A1 | 6/2011 | Kang et al. | |
| 2011/0164029 A1 | 7/2011 | King et al. | |
| 2012/0050007 A1 | 3/2012 | Forutanpour et al. | |
| 2012/0182215 A1* | 7/2012 | Han et al. | 345/156 |
| 2012/0256839 A1* | 10/2012 | Suggs | G06F 3/0202 345/168 |
| 2012/0274550 A1* | 11/2012 | Campbell | G06F 3/04883 345/156 |
| 2013/0257734 A1* | 10/2013 | Marti et al. | 345/168 |
| 2014/0152566 A1* | 6/2014 | Safer | G06F 3/0213 345/163 |

* cited by examiner

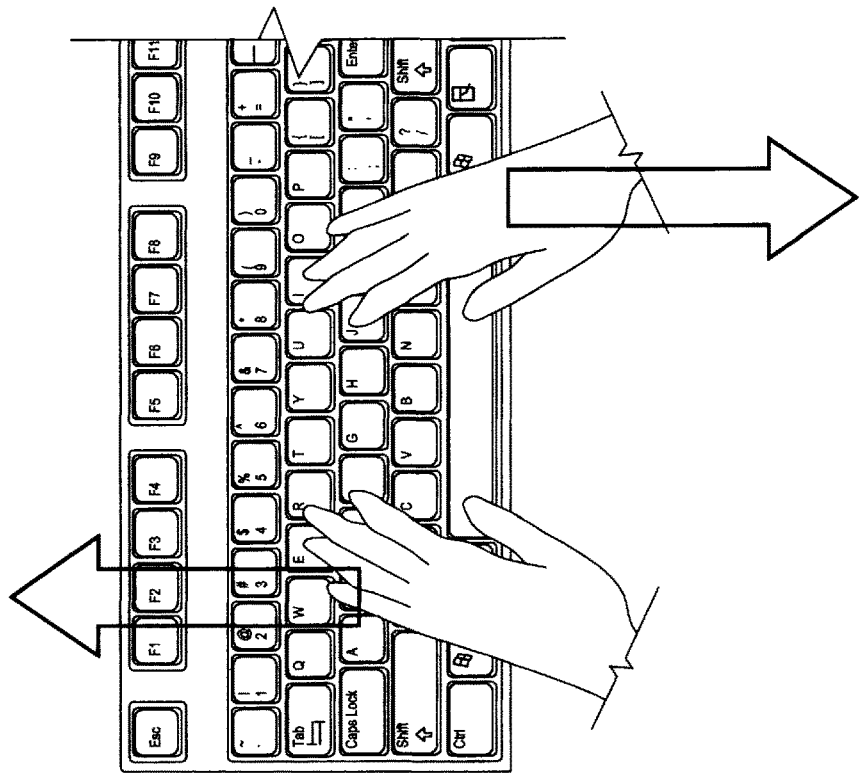
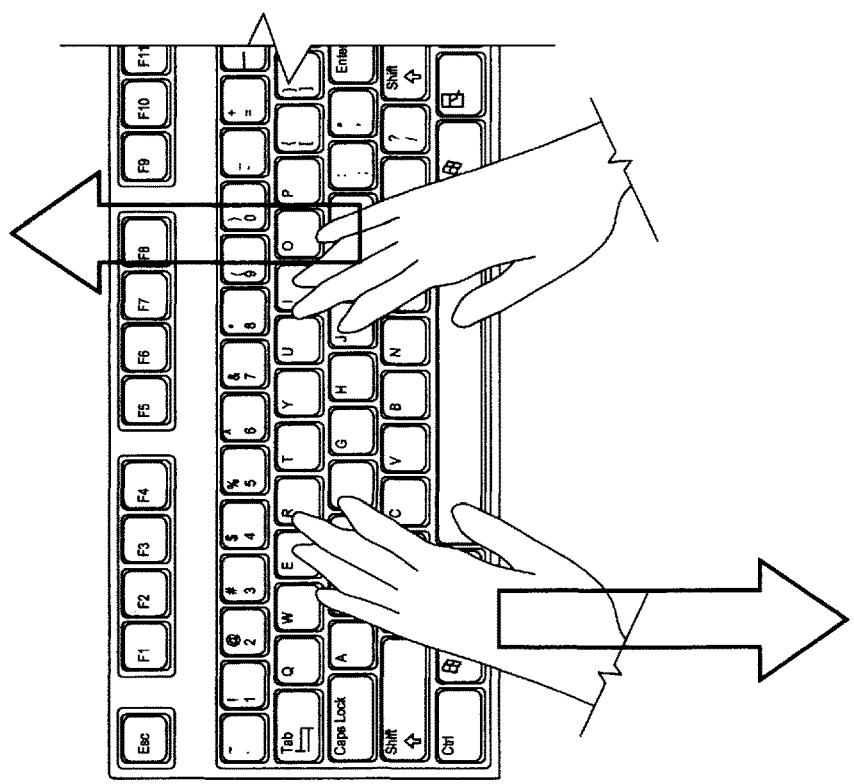
FIG. 3

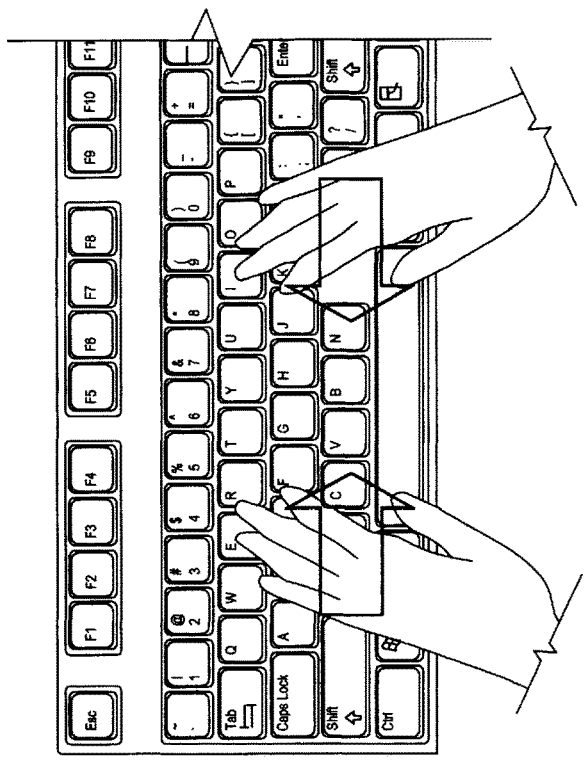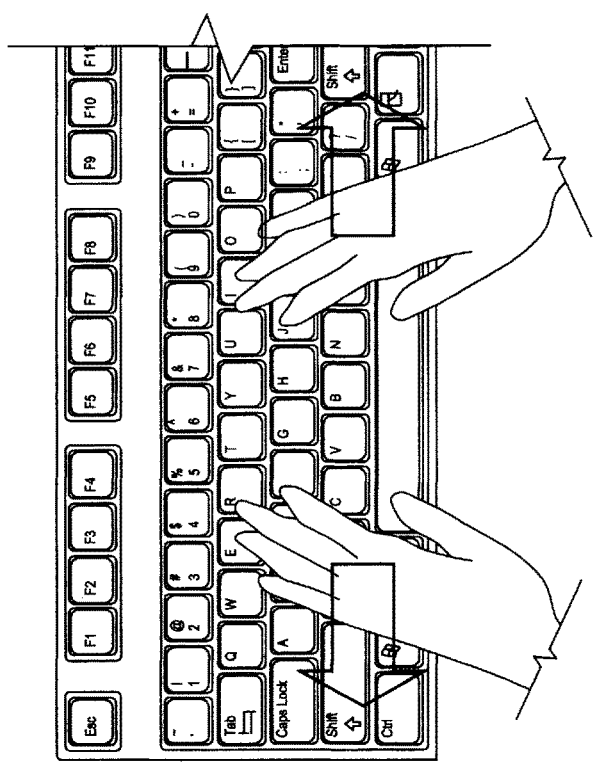
FIG. 4

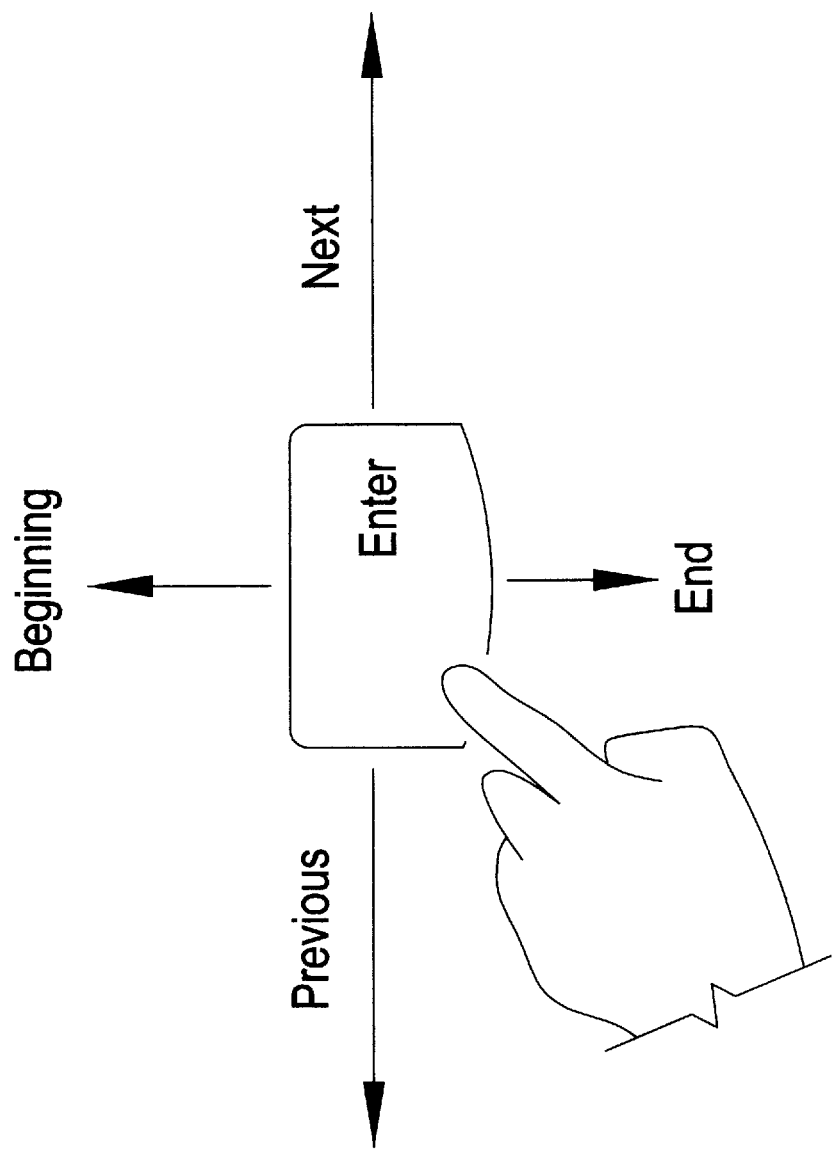

IDENTIFICATION AND USE OF GESTURES IN PROXIMITY TO A SENSOR

BACKGROUND

Information handling devices ("devices"), for example laptop or desktop computers, tablet computing devices, smart televisions, kiosks, and the like are used to for many tasks. Conventionally, users have interfaced with such devices using a variety of user input devices. Example user input devices include but are not limited to touch input devices, such as touch screens and touch pads, as well as mechanical input devices, such as a physical keyboard having mechanical keys. Some devices have begun to implement gesture input functionality, for example executing actions responsive to a gesture input such as a finger swipe or hand motion, as for example sensed using an optical or capacitive sensor.

BRIEF SUMMARY

In summary, one aspect provides a method, comprising: operating one or more sensors to detect gesture input proximate to a surface of an input device of an information handling device, wherein the input device is configured to receive one or more input types in addition to gesture input; determining, using a processor, if the gesture input detected matches a predetermined gesture; and executing at least one response action associated with the predetermined gesture.

Another aspect provides an information handling device, comprising: an input device having a surface, wherein the input device is configured to receive one or more input types in addition to gesture input; one or more sensors; one or more processors; and a memory operatively coupled to the one or more processors that stores instructions executable by the one or more processors to perform acts comprising: operating the one or more sensors to detect gesture input proximate to the surface of the input device; determining if the gesture input detected matches a predetermined gesture; and executing at least one response action associated with the predetermined gesture.

A further aspect provides a program product, comprising: a storage medium having computer program code embodied therewith, the computer program code comprising: computer program code configured to operate one or more sensors to detect gesture input proximate to a surface of an input device of an information handling device, wherein the input device is configured to receive one or more input types in addition to gesture input; computer program code configured to determine, using a processor, if the gesture input detected matches a predetermined gesture; and computer program code configured to execute at least one response action associated with the predetermined gesture.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

BRIEF DESCRIPTION OF THE SEVERAL VIEWS OF THE DRAWINGS

FIG. 3 illustrates an example of gesture input.
FIG. 4 illustrates another example of gesture input.
FIG. 8 illustrates another example of gesture input.

DETAILED DESCRIPTION

Figure 1:
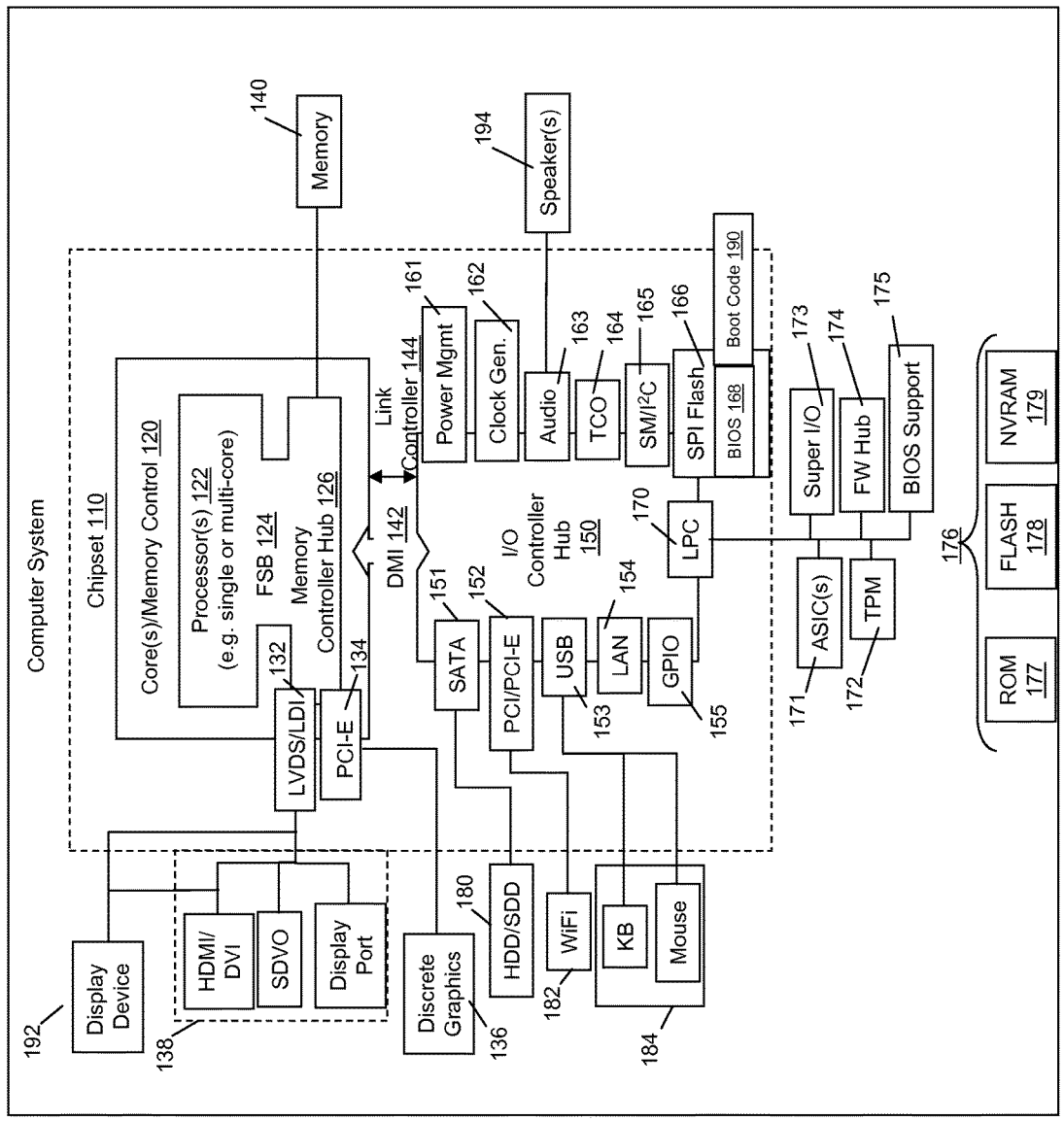
FIG. 1 illustrates an example information handling device and components thereof.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

While various devices have implemented gesture input based functionality, currently gesture input with respect to the surface of an information handling device (e.g., a surface of a clamshell laptop computing device containing a keyboard) is severely limited (e.g., to touch pad input). Moreover, the gesture input currently accepted is not integrated into a coherent system of inputs whereby other controls of the information handling device, e.g., keys or regions of an input device such as a keyboard, are used in concert with gesture inputs. For example, gesture input to a touch pad device is not integrated into a multi-input mechanism, such as holding down a key on a keyboard along with providing a gesture input to execute a particular function.

The lack of integration between the various inputs offered by current input devices extends to further scenarios. For example, keyboard input is not logically linked with gesture input. Thus, a user cannot hold down a keyboard key while providing gesture input to alter the gesture input. Thus, with a conventional device, holding down a key on a keyboard results in registering multiple key presses. For some keys such as "Backspace" this is useful. However, for most keys (letters, numbers, punctuation keys, etc.) this is not useful, and certainly cannot be leveraged to alter other (e.g., gesture) inputs.

Additionally, gesture input provided via a touching a surface (e.g., physically touching a touch pad) can pose several problems. For example, touch pads can be too small for some people's hands, which can make it difficult to use for gestures. Gesturing on a touch pad also requires the user to move his/her hands off of the keyboard to perform gestures. This can disrupt workflow. If the user's preferred pointing device is the touch pad, gesturing on a touch pad may cause inadvertent cursor movements and the like. Performing gestures on a touch screen (as opposed to a touch pad) is similarly restrictive, as implemented by some devices, because the gesture object (e.g., a user's finger(s)) obscures part(s) of the display. Depending on the type of gesture, such as a five finger pinch, this can interfere with a substantial portion of the display.

Accordingly, an embodiment provides integrated gesture input functionality. The integrated gesture input functionality provided by an embodiment allows for much more refined gesture inputs to be provided and interpreted, as well as affords mechanisms for integrating gesture inputs with standard inputs to achieve additional functionality heretofore unrealized. As an example, an embodiment provides a more useful function when holding down a key on a keyboard by using gesture input to supplement such key press input, or vice versa. As another example, an embodiment provides for higher resolution of gesture input, for example dividing the surface of an input device such as a keyboard into sub-regions (in the "x", "y" dimension) that impact the response to the gesture input detected in proximity thereto. Moreover, an embodiment provides using the detected proximity of the gesture input relative to the surface (i.e., the height of the gesture) as an additional characteristic that may impact the response to the gesture input. These and other added input opportunities, as further described herein, offer users a much richer and more useful experience when performing data handling and manipulation tasks involving gesture input.

The illustrated example embodiments will be best understood by reference to the figures. The following description is intended only by way of example, and simply illustrates certain example embodiments.

FIG. 1 depicts a block diagram of one example of information handling device circuits, circuitry or components. The example depicted in FIG. 1 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 1.

The example of FIG. 1 includes a so-called chipset 110 (a group of integrated circuits, or chips, that work together, chipsets) with an architecture that may vary depending on manufacturer (for example, INTEL, AMD, ARM, etc.). The architecture of the chipset 110 includes a core and memory control group 120 and an I/O controller hub 150 that exchanges information (for example, data, signals, commands, et cetera) via a direct management interface (DMI) 142 or a link controller 144. In FIG. 1, the DMI 142 is a chip-to-chip interface (sometimes referred to as being a link between a "northbridge" and a "southbridge"). The core and memory control group 120 include one or more processors 122 (for example, single or multi-core) and a memory controller hub 126 that exchange information via a front side bus (FSB) 124; noting that components of the group 120 may be integrated in a chip that supplants the conventional "northbridge" style architecture.

In FIG. 1, the memory controller hub 126 interfaces with memory 140 (for example, to provide support for a type of RAM that may be referred to as "system memory" or "memory"). The memory controller hub 126 further includes a low voltage differential signaling (LVDS) interface 132 for a display device 192 (for example, a CRT, a flat panel, touch screen, et cetera). A block 138 includes some technologies that may be supported via the LVDS interface 132 (for example, serial digital video, HDMI/DVI, display port). The memory controller hub 126 also includes a PCI-express interface (PCI-E) 134 that may support discrete graphics 136.

In FIG. 1, the I/O hub controller 150 includes a SATA interface 151 (for example, for HDDs, SDDs 180 et cetera), a PCI-E interface 152 (for example, for wireless connections 182), a USB interface 153 (for example, for devices 184 such as a digitizer, keyboard, mice, cameras, phones, microphones, storage, other connected devices, et cetera), a network interface 154 (for example, LAN), a GPIO interface 155, a LPC interface 170 (for ASICs 171, a TPM 172, a super I/O 173, a firmware hub 174, BIOS support 175 as well as various types of memory 176 such as ROM 177, Flash 178, and NVRAM 179), a power management interface 161, a clock generator interface 162, an audio interface 163 (for example, for speakers 194), a TCO interface 164, a system management bus interface 165, and SPI Flash 166, which can include BIOS 168 and boot code 190. The I/O hub controller 150 may include gigabit Ethernet support.

The system, upon power on, may be configured to execute boot code 190 for the BIOS 168, as stored within the SPI Flash 166, and thereafter processes data under the control of one or more operating systems and application software (for example, stored in system memory 140). An operating system may be stored in any of a variety of locations and accessed, for example, according to instructions of the BIOS 168. As described herein, a device may include fewer or more features than shown in the system of FIG. 1.

Information handling devices, as for example outlined in FIG. 1, may include user devices such as an input device, for example a keyboard, with a surface having one or more standard controls (e.g., mechanical keys, a touch pad, track point or the like). The input device may be configured to respond to one or more non-gesture inputs (e.g., mechanical key press, touch pad input, etc.) in addition to the gesture input. The information handling device additionally includes one or more sensors that detect gesture input, including two-dimensional characteristics of the gesture input (e.g., "x", "y" coordinates thereof) and/or the proximity of the gesture input (e.g., the height above the surface, e.g., "z" distance above a keyboard of a laptop computing device). The one or more sensors may be selected dependant on the type of gesture input to be detected. For example, the one or more sensors may include optical or capacitive sensors, or a combination thereof. Thus, more than one sensor and more than one sensor type may be employed.

Figure 2:
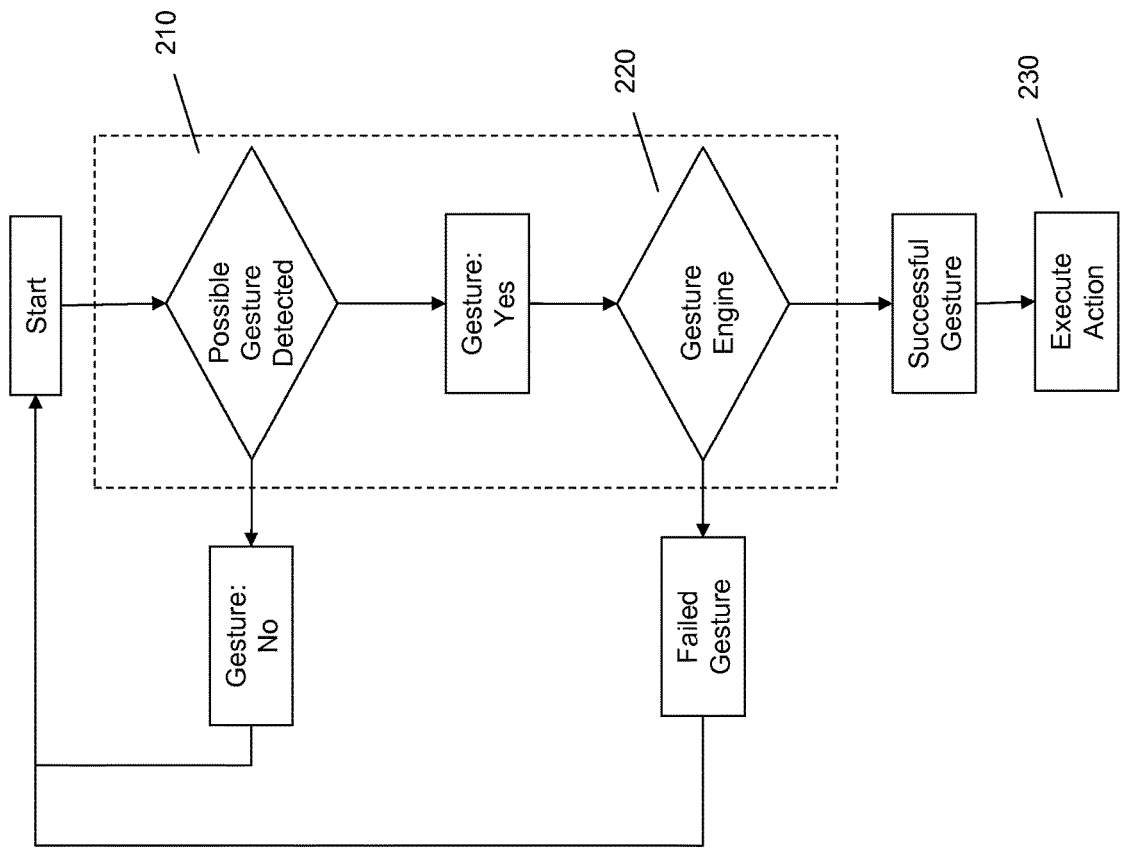
FIG. 2 illustrates an example method of identification and use of gestures in proximity to a sensor.

Referring to FIG. 2, a general overview of operations of a gesture recognition system is illustrated. In an embodiment, a gesture system is activated, e.g., at startup of the information handling device and remains ready to detect possible gestures. The gesture system may be returned to ready state in several ways, including but not limited to performing a specific gesture, idle timeout during a possible detection gesture, or failure to identify a detected gesture, as further described herein.

A user movement may occur (e.g., user provides gesture input above a surface of a keyboard) that is recognized as a possible gesture by one or more sensors. For example, responsive to user hand movement an input is recognized (e.g., exceeding a minimum noise threshold) and the system proceeds to attempt to identify the movement at 210 as gesture. If the movement exceeds a gesture threshold, e.g., is movement detected above a minimum noise level) at 210, the system may attempt to identify the gesture detected. Otherwise, the input, although detected at some level, may be disregarded as not gesture input (e.g., if the input exceeds a predetermined noise threshold but does not exceed a predetermined gesture threshold). Thus, if the system determines that the detected input is not a gesture at 210, the system returns to the initial state, ready to detect possible gestures.

However, if the input is detected as gesture input at 210, the gesture engine analyzes the input and determines what to do next at 220. If the gesture input is successful (e.g., meaning that the gesture input detected matches a gesture in a gesture library) at 220, the gesture engine outputs a successful gesture identification and initiates performance of the response action(s) that correspond to that particular gesture at 230. On the other hand, if the gesture identification at 220 fails (e.g., meaning that the gesture does not match anything in the gesture library), the system returns to the initial state ready to detect possible gestures. When the gesture input is successful and the system executes the appropriate corresponding response action(s) at 230, after this is accomplished, the system returns to the initial state ready to detect possible gestures at 210.

Thus, once the system is on and ready to detect gestures, it begins to monitor the area(s) above the relevant surface for potential gesturing input. If all or some portion of the criteria outlined in FIG. 2 is/are met, the gesture engine acts to interpret the gesture input data and take appropriate response action(s). Some example parameters that the gesture engine may use for detecting possible gesturing input, and for choosing one or more appropriate response actions, include but are not limited to layer/height associated with the detected gesture, location (e.g., "x", "y" dimensions of the gesture) of the detected gesture, shape of the detected gesture, and speed of the detected gesture.

By way of clarification, some terms used throughout this description are defined herein as follows. As described herein, the term "sensor" refers to the hardware and software combination that detects, recognizes, interprets and acts by gathering information about gestures, analyzing that information and provides information for determining which (if any) gesture is being performed by the user. A sensor may for example be an optical (e.g., infrared or visible light based sensor) or a projected capacitance based sensor, or a combination thereof; however, other sensor types may be employed that are suitable for sensing gesture inputs, as further described herein. Furthermore, as used in this document, the term "hover" (or hovering or the like) means input detected by a sensor without physical contact between the object detected and the sensor. The term "grazing" (or like variation) as used in this document takes the meaning of light physical contact (e.g., physical contact with a surface of a keyboard key not sufficient to depress and actuate a control, such as activating input of the key press on the keyboard key using capacitance).

In an embodiment, the layer/height of the detected gesture input (e.g., "z" distance above a sensor or surface associated therewith) may be used by an embodiment to refine a response to the gesture input. For example, the closer the detected gesture input (relative to a sensor or surface associated therewith), the more "x", "y" sub-regions there are. Thus, a gesture input closer to the sensor may provide more refined input data (owing to the increased number of "x", "y" sub-regions) than that of a gesture input that is further away from the sensor (e.g., user providing course gesture input). Furthermore, the layer in which a gesture takes places, as detected by a sensor, may inform the appropriate response action to be selected. A "layer" is a height metric that an embodiment may use to determine the vertical distance of the gesturing body (e.g., user hand or finger) from the sensor. A layer may be divided into multiple sub-layers, as described in the following examples.

For detection of height-dependent hovering gestures an embodiment may interpret gesture input dependent upon the height of the gesture over the surface (co-localized with one or more sensor(s), e.g., optical sensors disposed about a keyboard of a laptop computing device). A gesture over the surface without making actual contact with the surface may thus be detected (e.g., user waving one or both hands over the keyboard without touching the keyboard), and the response to the gesture input may be dependent on the height (e.g., height of user hand over the keyboard) detected. The height detection may be implemented in a variety of ways, for example intensity of optical reflection or capacitive signal produced by the gesture input.

For height-independent hovering gestures, an embodiment may base the interpretation of the gesture input as independent of the height of the gesture movement over the surface. For example, if the gesture movement is over the surface without making the actual contact (i.e., hovering input), the response to the gesture movement providing the gesture input may be the same, irrespective of the height of the gesture input. Additionally, the step of detecting or inferring the height of the gesture input may be omitted (i.e., the height of the gesture input may be disregarded by an embodiment for particular gesture input scenarios).

For grazing gesture input, an embodiment may use the gesture input along with a sub-threshold contact with the surface to provide a response action. For example, a user may exceed a first threshold of contact (e.g., minimal contact with a surface such as a keyboard key) without activating the surface or the control dedicated the surface on activation (e.g., the user may not contact a keyboard key with sufficient force to exceed a threshold of actually depressing and activating the key). As an example, a user may swipe one finger from right to left over the surface of the "Backspace" key to delete an entire word. In this example, an embodiment detects the grazing gesture input (the swipe of the key), but because the user does not press the Backspace key, an embodiment interprets the gesture input of the direction swipe to implement the action of deleting a word and does not utilize a key press.

For pressing input, an embodiment may use the gesture input along with pressing contact of a surface to activate the surface or the control dedicated to the surface. For example, in response to a user pressing and holding on the "C" key and swiping up (with a second hand) while the "C" key is depressed, an embodiment may implement a select and/or a copy action, without inputting the "C" letter input action.

An embodiment may implement a "fuzzy" or indeterminate zone for layered input. For example, as an upper-most layer (distal from a surface/sensor), while the sensor may still sense the gesturing body, the sensor may not be detecting specific enough data to determine possible gestures. In the event of receiving gesture input in a fuzzy zone, the system may ignore the gesturing, although detected, or may prompt the user to repeat the input. This may correspond to action at 210 of FIG. 2, i.e., sensing input but not detecting a gesture, or may correspond to action at 220 of FIG. 2, i.e., sensing gesture input but not completing a match with a predetermined gesture. Again, this determination may be supplemented with an indication to the user that the gesturing body/input thereof has been detected, but more information is required (e.g., repeated attempt, providing gesture input closer to the sensor, etc.).

An embodiment may utilize hovering gestures in either static or dynamic form (i.e., gesture inputs without contact with a surface, with or without movement) to implement response actions. For example, the gesture system may characterize hover gesture based(s) on, but not limited to, the attributes and/or the combination of the attributes in a hover gesture provided above a sensor. Some non-limiting examples attributes and their descriptions are provided in Table 1.

TABLE 1

Example Hover Attributes
HOVER GESTURES

| Attribute | Description |
| --- | --- |
| Layer | Varying heights of the gesture over the surface |
| Location | The specific area in which the gesture is projected into the surface |
| Shape | The shape of the area in the surface where the gesture is perpendicularly projected into |
| Speed | The movement speed of the gesture in related to the surface |
| Pre-trigger duration | The time threshold that requires for a gesture to trigger a response |
| Pre-trigger repetition | The repetition that requires for a gesture to trigger a response |
| Flow | The flow pattern of the response since a gesture is triggered |
| Trajectory | The movement path of the gesture in 3-dimensional space in related to the hover surface. |
| Modifier | A response is modified by One or multiple activated control (e.g. key, touchpad button, etc) before, during or after the gesture. |

An embodiment may employ two dimensional (2-D), "x", "y", location detection to refine response actions to various gesture inputs. For example, an embodiment may use location data to determine where the gesture object(s) (e.g., hand(s), finger(s) and/or artifacts such as a pen, stylus, cell phone) are located on a 2-D area within range of the gesture sensor(s). As described herein, the amount of data collected may be coordinated with a height/layer determination, for example the "x", "y" sub-regions may be divided differentially based on the height of the gesture input detected. For example, an embodiment may define regions including but not limited to the keyboard, the track pad, and the palm rest areas. Thus, gesture inputs to any of these areas may be handled/interpreted differently (and different actions may be executed in response to determining gesture input has been provided into the different sub-regions or areas).

An embodiment may provide control-dependent interpretation of the gesture input. Thus, the interpretation may be dependent upon the control underneath the gesture input. As an example, a swipe over the "Backspace" key on the keyboard surface is interpreted differently than a swipe over the "Spacebar" key. As another example, a gesture over the number pad region on the keyboard surface may be interpreted differently than a gesture over the letter key region.

An embodiment may use shape of the gesture input (i.e., static gesture input) to determine an appropriate response action, either alone or in combination with other gesture attributes. For example, an embodiment may determine the shape of the gesturing body, e.g., open versus closed hand detected, to implement a given response action. Among the differently shaped gesturing bodies that may be detected are for example closed versus open hand(s), a number of extended fingers, the spacing between extended fingers, a uniform gesturing body versus a non-uniform gesturing body, or suitable combinations of the foregoing. These static gesture inputs may be used to determine shape of the gesture and to execute different response actions.

An embodiment may utilize the shape in connection with other attributes of the gesture, e.g., the area of the surface or region thereof where the gesture input is perpendicularly projected into. An embodiment may determine the shape by, but not limited to, detecting the 2-D shape, detecting the 3-D shape, inferring the posture or the orientation of the gesturing body in the projection area detectable by the sensor(s), and the like. For example, an embodiment may utilize detection of one or more finger(s), hand(s), body part(s) (e.g., face) and/or artifacts contained in the gesture area. Examples of different shapes that may be detected include, but are not limited to, the combination of one or multiple finger extension, finger flexion or degree of flexion (between contracted and extended). An embodiment may detect a different number of fingers extended to discern different types of gestures. The fingers detected may be on the same hand or different hands, with differing gesture input detection resulting therefrom. An embodiment may additionally detect the combination of one or both hands in closed, opened, or intermediate posture as indicative of differing gesture inputs. Likewise, finger spreading (actively moving fingers closer together or farther apart) may be detected as a shape gesture that is dynamic. Combinations of the above examples, or like examples, may be detected as shape input that determines the gesture input action executed by the system.

An embodiment may use dynamic characteristics of the gesture input to determine gesture input actions. For example, an embodiment may use the speed of the gesture (in relation to the surface) as a dynamic characteristic of the gesture input for choosing an action to execute. Dynamic inputs may be speed-independent or speed dependent, as contrasted from static inputs. For example, a static gesture in one in which the gesture is held in a position (so the speed is zero or substantially zero). A dynamic, speed-independent gesture is one in which the overall gesture is moving in relation to the surface; however, the interpretation of the gesture input is not dependent on the speed of the gesture. A dynamic, speed-dependent gesture is a gesture in which the overall gesture input is moving in relation to the surface, and further, the interpretation of the gesture is dependent upon the speed detected.

An embodiment may additionally utilize duration or repetition, alone or in some combination with one another or with other attributes of a gesture, to interpret gesture inputs. For example, pre-trigger events in terms of duration may include using a time threshold required for a gesture input to trigger a response action. Thus, a trigger may be set to substantially instantaneously trigger a response action once the gesture input is recognized. Also, a trigger may be set to require input of certain duration (e.g., threshold required duration of input), where a response action only occurs after the gesture input is registered for a period of time exceeding the time threshold.

A pre-trigger with respect to repetition may include requiring repeated gesture input to trigger a response action. For example, in contrast to executing a response action once the gesture input is recognized, an embodiment may require that repetition is required as a triggering event. Thus, a response action only occurs after a gesture repeats itself for a certain number of times (e.g., a motion pattern is repeated as gesture input).

The trajectory of a gesture input may additionally be utilized to interpret the gesture input and trigger a response action. For example, an embodiment may determine the movement path of the gesture in three-dimensional (3-D) space in related to a surface. A trajectory for example may be determined by either the motion of finger(s), hand(s), other body part(s) and/or artifact(s) comprising the gesture, or the motion of the overall gesture entity (e.g., as averaged together). Of note is that trajectory is the movement path of the gesture over a time window, instead of a certain time point, which would be more appropriately characterized as gesture shape (e.g., orientation of a hand gesture input). Thus, the trajectory attribute does not apply to a static gesture. Examples of trajectory gestures may include, but are not limited to: swiping motions (e.g., on a surface), rotation motion (e.g., on or above a surface), pinching motions (e.g., on or above a surface), waving motions (e.g., on or above a surface), rolling motions (e.g., on or above a surface), changing finger and/or hand orientation (e.g., changing the shape of a gesture body over time), and/or drawing motions (e.g., free form input on or above a surface).

The response action or actions taken in response to the interpretation of gesture input(s) may take a variety of forms. The response action(s) may in turn be modified responsive to one or more additional gesture inputs or other inputs of an input device. For example, the flow pattern of the response action may be discrete or continuous. Thus, a gesture input may trigger a response action with a flow pattern that is discrete, i.e., a response action is triggered as a single event. An example of a discrete response action is tracing a cross or "X" shape as gesture input, followed by a closing of an application window on screen. That is, once the gesture input of "X" is ascertained, the response triggered is discrete.

A flow pattern may be continuous as well, i.e., the response action occurs and continues (and may be modified) while the gesture input is ongoing. An example of a continuous flow pattern response action is a two finger pan-to-scroll down a web page. Here, the initial response of scrolling may be initiated at the beginning of the gesture input and may be continued throughout receipt of the gesture input.

A response action may also be modified by a modifier. For example, a response may be modified by one or multiple activated controls (e.g., a key, a touchpad, a button, etc.) before, during or after the gesture input is provided. Examples of modifiers may include, but are not limited to, one or more key press(es), one or more button press(es), or a combination of the foregoing.

FIG. 3 through FIG. 10 illustrate examples of gesture inputs and response actions. Each example is given to highlight aspects of various embodiments and each example may be used in connection with one or more other examples. In each example, a gesture input of some form is identified based on one or more attributes and a response action or actions are executed in response to matching the identified gesture input to a predetermined gesture input, for example as stored in a library of gestures.

EXAMPLE I

Two-Hand Rotation

As illustrated in FIG. 3, a user places two hands grazing or hovering over a surface (e.g., a capacitive keyboard surface shown as an example), and moves one hand up while the other hand moves down. Using this gesture motion, a user mimics the clock-wise/counter clock-wise rotation desired, e.g., of on-screen content. The gesture system (as outlined in FIG. 2) will detect the gesture input, match it in a gesture stored in a gesture library, and execute a response action, e.g., rotate the appropriate content (e.g., a picture, a web page, a document, etc.). While the two hands keep moving in this circular motion, gesture input is continually received, and an embodiment implementing a continuous flow pattern response action may continue the rotation response action. The speed of the rotation may be matched to the speed of the hands movement, i.e., the gesture input may modify the response action.

Table 2 contains the attribute/value pairs representing the attribute or characteristic of the gesture input detected and the value thereof for the example of FIG. 3.

TABLE 2

Two-hand rotation

| Attribute | Value |
| --- | --- |
| Layer | Grazing |
| Location | N/A |
| Shape | Two-hand open |
| Speed | Dynamic, speed-dependent |
| Pre-trigger duration | Instantaneous |
| Pre-trigger repetition | Once |
| Duration | Continuous |
| Trajectory | Rotation |
| Modifier | N/A |

EXAMPLE II

Two-Hand Pinch

As illustrated in FIG. 4, a user places two hands over a surface (e.g., a capacitive keyboard surface shown as an example) and executes a pinching motion. The gesture system will detect this gesture input as matching a pinching motion stored in the library of gestures (e.g., matching a pinch-in or pinch-out gesture), and output a signal to a display screen to zoom in/out the appropriate content (e.g., a picture, a web page, or a document, etc.). While the user keeps moving his or her two hands in the pinch motion, the zoom will continue, i.e., a continuous flow pattern as described herein. The speed of the zoom may depend on the speed of the hands' movement, i.e., the speed of the hand gesture acts as a modifier of the response action.

Table 3 contains the attribute/value pairs representing the attribute or characteristic of the gesture input detected and the value thereof for the example of FIG. 4.

TABLE 3

Two-hand pinch

| Attribute | Value |
| --- | --- |
| Layer | Grazing |
| Location | N/A |
| Shape | Two-hand open |
| Speed | Dynamic, speed-dependent |
| Pre-trigger duration | Instantaneous |
| Pre-trigger repetition | Once |
| Duration | Continuous |
| Trajectory | Pinch |
| Modifier | N/A |

EXAMPLE III

One-Hand Waving

Figure 5:
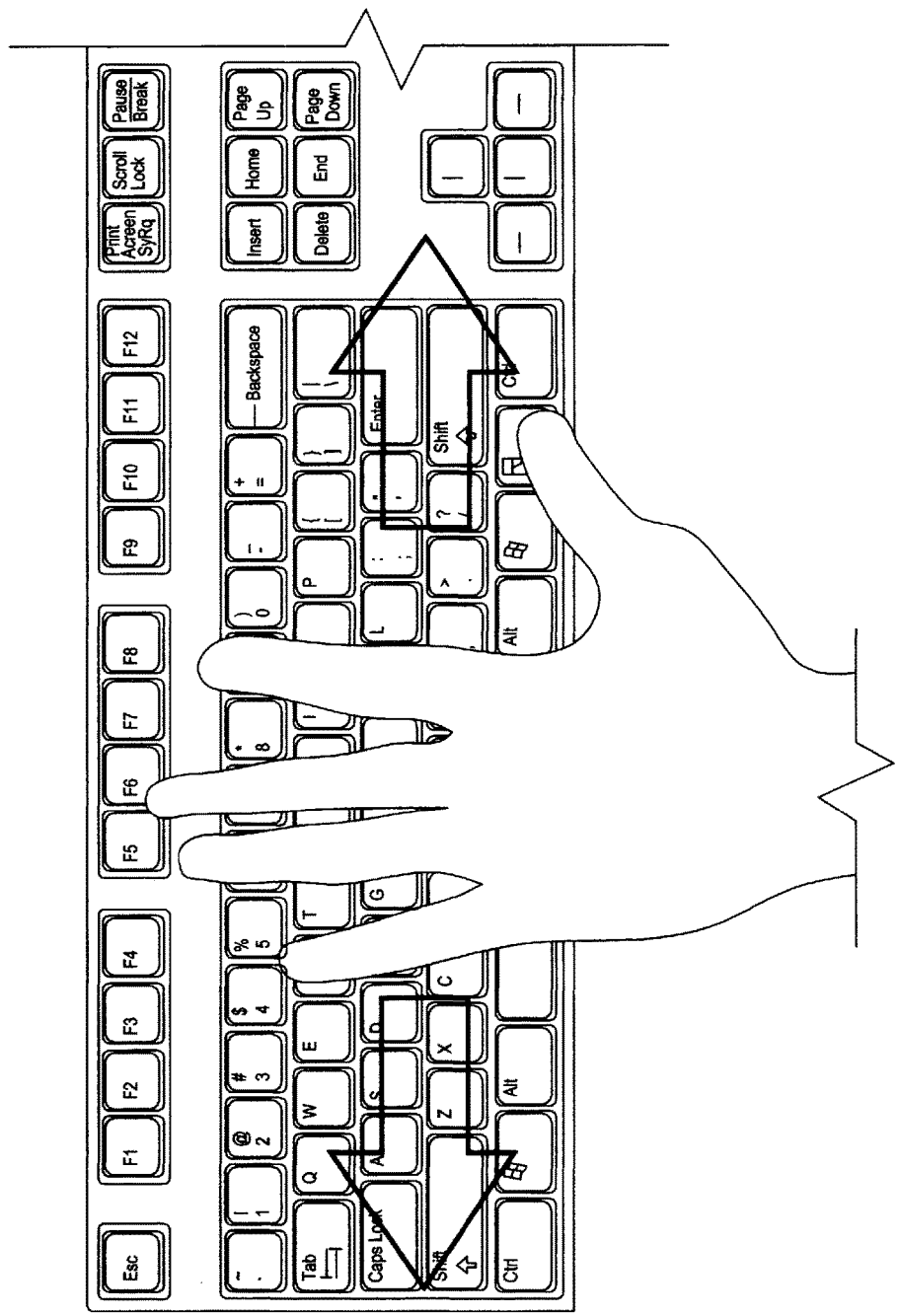
FIG. 5 illustrates another example of gesture input.

As illustrated in FIG. 5, a user may wave an open hand back and forth over a surface (again, the example illustrated in FIG. 5 is a keyboard) in a lateral back and forth motion (or alternatively, use the wrist as an axis and move the hand in an arcing motion) a predetermined number of times (e.g., three times). Responsive to this gesturing input including a trigger, the gesture system may match the detected gesture input to a gesture input in the library of gestures, and may switch to a different installed keyboard or input method. For example, the switch could be between keyboard layouts (such as switching from a QWERTY layout to DVORAK layout) or keyboard languages (such as from English to French). Thus, an embodiment uses a pre-trigger pattern (e.g., repeated waving motions—three times), to issue a discrete response action, e.g., keyboard layout switch.

Table 4 contains the attribute/value pairs representing the attribute or characteristic of the gesture input detected and the value thereof for the example of FIG. 5.

TABLE 4

One-hand waving

| Attribute | Value |
| --- | --- |
| Layer | Grazing |
| Location | N/A |
| Shape | One-hand open |
| Speed | Dynamic, speed-independent |
| Pre-trigger duration | N/A |
| Pre-trigger repetition | Three times |
| Duration | Discrete |
| Trajectory | Waving |
| Modifier | N/A |

EXAMPLE IV

One Finger Drawing in a Region

Figure 6:
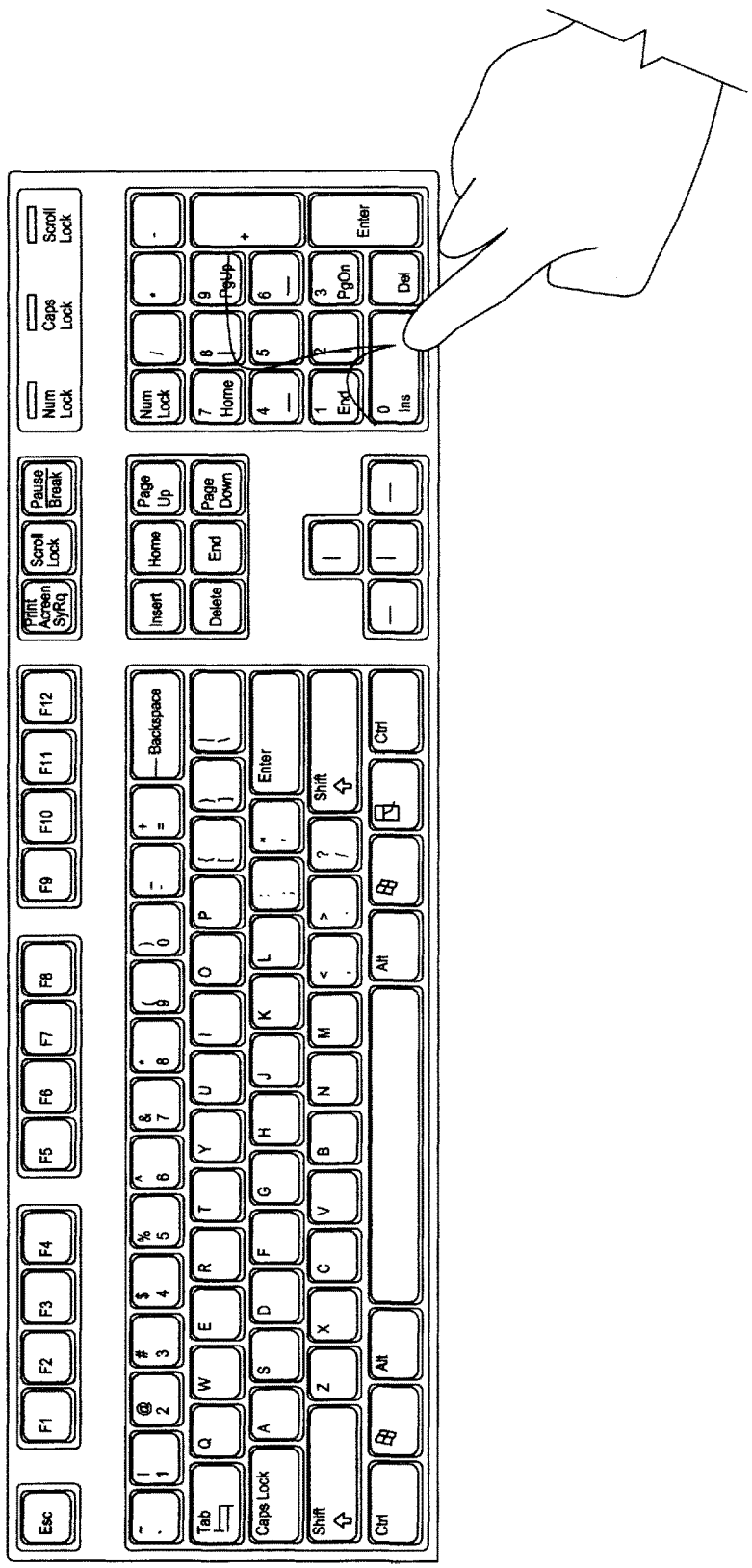
FIG. 6 illustrates another example of gesture input.

As illustrated in FIG. 6, a user may position a finger (or artifact, such as a pen) over the number pad section, and move the finger in a predefined drawing pattern. If the user successfully draws a predetermined symbol pattern, for example a mathematical function, the gesture input will be matched by the gesture system to a stored gesture for that symbol in the gesture library. Then, the gesture system will output a signal to initiate the appropriate response action. As an example, when user draws "√" over the number pad section, this gesture input will be interpreted/matched as a mathematical symbol "√", and this mathematical may be displayed as if the user had selected this mathematical symbol in an application (e.g., inserted the symbol in a MICROSOFT WORD document from a symbol menu). Therefore, an embodiment uses regional interpretation (e.g., gesture input over the number pad region) to execute a discrete response action (e.g., insertion of a mathematical symbol).

Table 5 contains the attribute/value pairs representing the attribute or characteristic of the gesture input detected and the value thereof for the example of FIG. 6.

TABLE 5

One finger drawing.

| Attribute | Value |
| --- | --- |
| Layer | Grazing |
| Location | Region-dependent: over the number pad section |
| Shape | One finger extension |
| Speed | Dynamic, speed-independent |
| Pre-trigger duration | Instantaneous |
| Pre-trigger repetition | Once |
| Flow | Discrete |
| Trajectory | Free drawing |
| Modifier | N/A |

EXAMPLE V

Figure 7:
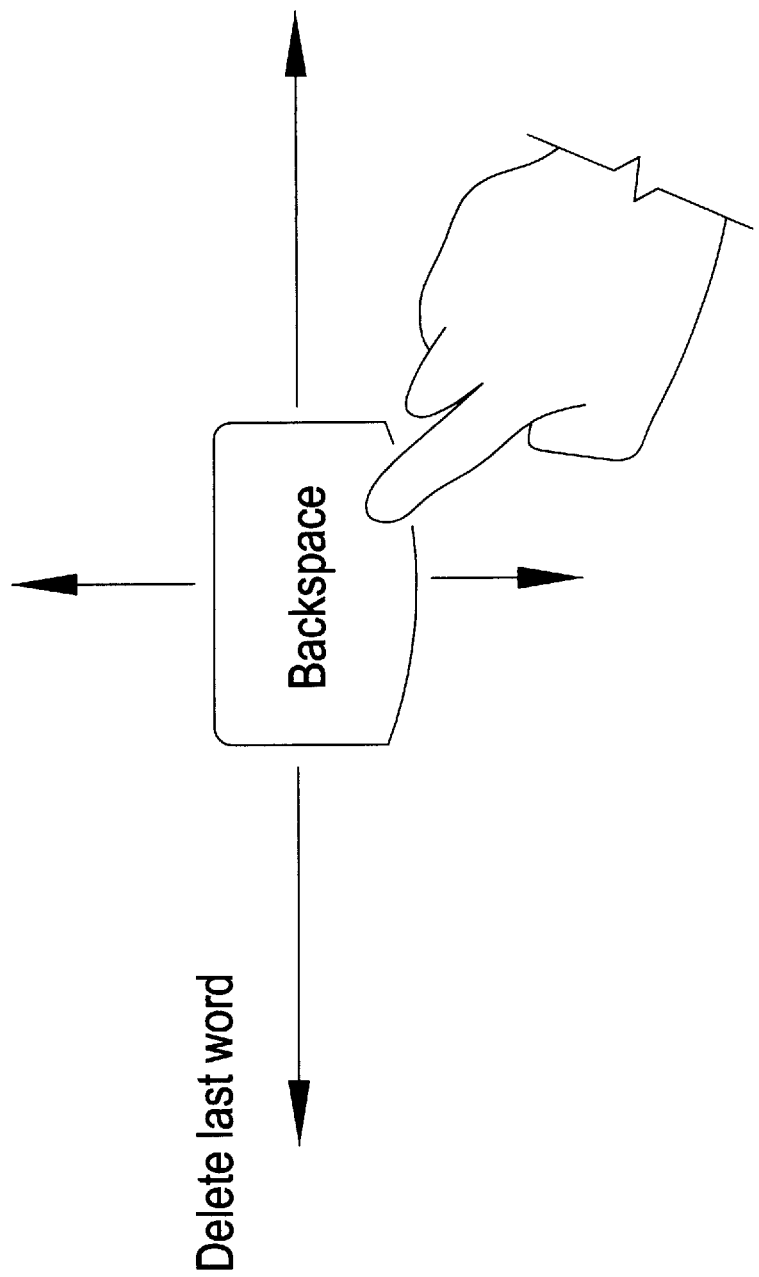
FIG. 7 illustrates another example of gesture input.

One Finger Swipe Gesture Over the Sub-Region of Surface to Execute Discrete Action As illustrated in FIG. 7, a user may provide a gesture input relative to a particular surface sub-region to execute an action. For example, in appropriate content (e.g., document on a display screen, etc.), a user may provide one finger swipe gesture input, e.g., a grazing over the "Backspace" key, to delete the last word input. Thus, an embodiment uses regional interpretation (e.g., gesture input over a specific key) along with a height interpretation (i.e., grazing input) to execute a discrete response action (e.g., deletion of a pre-determined input such as the last word entered).

Table 6 contains the attribute/value pairs representing the attribute or characteristic of the gesture input detected and the value thereof for the example of FIG. 7.

TABLE 6

One finger swipe over the Backspace key

| Attribute | Value |
| --- | --- |
| Layer | Grazing |
| Location | Control-dependent: The gesture is over the "Backspace" key |
| Shape | One finger extension |
| Speed | Dynamic, speed-dependent |
| Pre-trigger duration | Instantaneous |
| Pre-trigger repetition | Once |
| Flow | Discrete |
| Trajectory | Swipe |
| Modifier | N/A |

EXAMPLE VI

One Finger Swipe Gesture Over the "Enter" Key to Select

As illustrated in FIG. 8, a user may provide a one finger swipe gesture (grazing input) over the "Enter" key on a user interface control (e.g., laptop keyboard). In response to receiving this input, the gesture system may match the gesture input to a gesture in the gesture library and provide a signal that prompts the main system to display a prompt to the user. The prompt displayed to the user may prompt the user to make a selection (e.g., list box, combo-box, dialogue box, etc). The gesture input may alternatively be used to allow the user to navigate through selectable items already listed, for example moving forward or backwards in a listing depending on the direction of the swipe gesture.

Moreover, an embodiment may utilize speed as a gesture input characteristic, for example interpreting a quicker swipe motion (e.g., a flick motion exceeding a predetermined speed) to navigate through the options more quickly. Moreover, an embodiment may interpret different gesture inputs to execute different discrete response actions. For example, a swipe gesture up or down on the "Enter" key may trigger a response action moving a selection indicator to the beginning of a list or to the end of the list, respectively. Once on the desired item has been highlighted with a selection indicator, the user may provide additional input (e.g., a mechanical press of the Enter key) to make the selection.

Table 7 contains the attribute/value pairs representing the attribute or characteristic of the gesture input detected and the value thereof for the example of FIG. 8.

TABLE 7

One finger swipe gesture over the Enter key

| Attribute | Value |
| --- | --- |
| Layer | Grazing |
| Location | Control-dependent: The gesture is over the "Enter" key |
| Shape | One finger extension |
| Speed | Dynamic, speed-dependent |
| Pre-trigger duration | Instantaneous |
| Pre-trigger repetition | Once |
| Flow | Discrete |
| Trajectory | Swipe |
| Modifier | N/A |

EXAMPLE VII

Gesture Input with Pressing and Holding a Hotkey

Figure 9A:
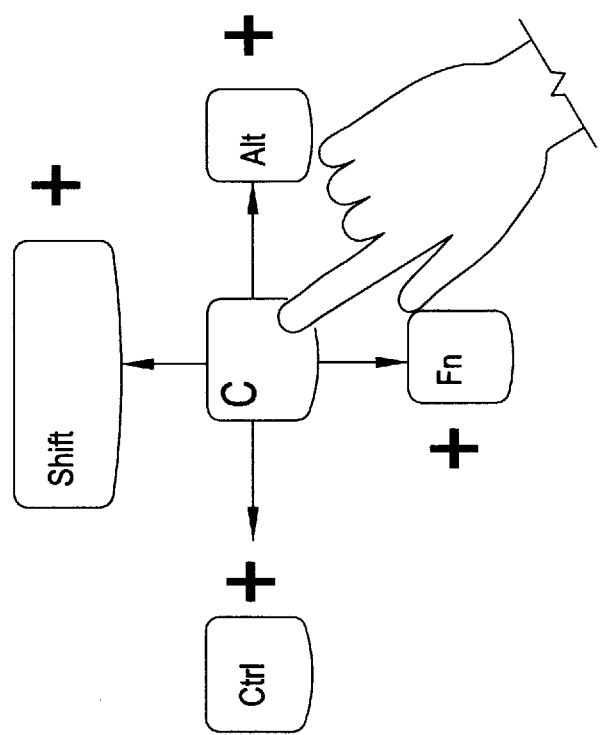
FIG. 9(A-B) illustrates another example of gesture input.
Figure 9B:
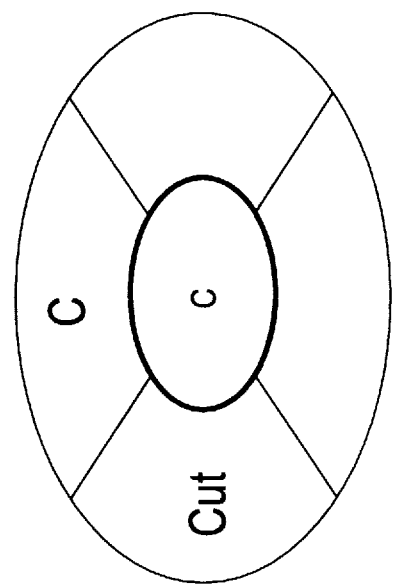

As illustrated in FIG. 9A, a user may press and hold a hotkey (e.g., a letter key) for a predetermined threshold time (e.g., one second). An embodiment may interpret this input as initiating a gesture input/response action pair. For example, responsive to pressing and holding a hotkey, the system will respond by being receptive to certain gesture inputs. For example, as illustrated in FIG. 9A, the user can swipe in multiple directions to select hotkey gesture actions with respect to that letter. For example, holding the "C" letter key and swiping to the left can result in "Copy" (Ctrl+C), swiping up can result in a capital "C" (corresponding to mechanical input of Shift+C), and swiping right can result in Alt+C, or swiping down can result in a Fn+C. In the example illustrated in FIG. 9B, only certain gestures may result in gesture based hotkey functions, whereas where no function may be associated with another hotkey/gesture input (e.g., pressing the "C" letter key and swiping to the right).

Table 8 contains the attribute/value pairs representing the attribute or characteristic of the gesture input detected and the value thereof for the example of FIG. 9 (A-B).

TABLE 8

Gesture input with pressing and holding a hotkey

| Attribute | Value |
| --- | --- |
| Layer | Pressing |
| Location | Control-dependent: The gesture is over a specific letter key (e.g. "C"). |
| Shape | One finger extension |
| Speed | Dynamic, speed-independent |
| Pre-trigger duration | Threshold-required |
| Pre-trigger repetition | Once |
| Flow | Discrete |
| Trajectory | Swipe |
| Modifier | Letter key (e.g. "C") |

EXAMPLE VIII

Shape Change to Execute Function

Figure 10:
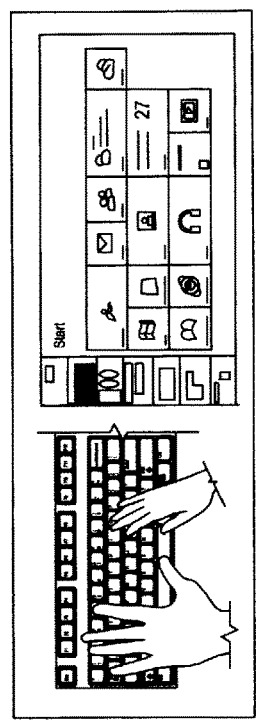
FIG. 10 illustrates another example of gesture input.

As illustrated in FIG. 10, finger extension and spreading (e.g., a user extending five fingers in a posture that fingers are away from each other) may be used to view open applications or applications pinned to the task bar in an operating system such as WINDOWS 8 operating system. Thus, the system detects a predetermined gesture, for example the user opening his or her left hand as illustrated in FIG. 10, and maps this detected gesture input to a gesture in the library of gestures. Responsive to a match, an embodiment executes a predetermined discrete function, such as providing a display of open applications or applications pinned to the task bar.

Accordingly, as outlined in the various example embodiments described herein, a gesture system may detect gesture inputs and map these gestures to one of a library of saved gesture inputs. Responsive to a match, an embodiment may execute a discrete or continuing response action, which may be modified by additional input(s). Accordingly, the various embodiments provide for receiving gesture inputs over a surface such as a keyboard of a laptop computing device and executing actions commensurate therewith.

While the various example embodiments have been described in connection with the examples provided herein, these were provided as non-limiting examples. Accordingly, embodiments may be used in similar contexts with similar devices and methods. Similarly, although devices such as laptop computing devices have been used in the description as specific examples, embodiments may be utilized in connection with other types of devices, for example, desktop computers, smart televisions and displays, kiosks, and the like.

It will also be understood that the various embodiments may be implemented in one or more information handling devices configured appropriately to execute program instructions consistent with the functionality of the embodiments as described herein. In this regard, FIG. 1 illustrates a non-limiting example of such a device and components thereof.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

Any combination of one or more non-signal device readable medium(s) may be utilized. The non-signal medium may be a storage medium. A storage medium may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider) or through a hard wire connection, such as over a USB connection.

Aspects are described herein with reference to the figures, which illustrate example methods, devices and program products according to various example embodiments. It will be understood that the actions and functionality illustrated may be implemented at least in part by program instructions. These program instructions may be provided to a processor of a general purpose information handling device, a special purpose information handling device, or other programmable data processing device or information handling device to produce a machine, such that the instructions, which execute via a processor of the device implement the functions/acts specified.

The program instructions may also be stored in a device readable medium that can direct a device to function in a particular manner, such that the instructions stored in the device readable medium produce an article of manufacture including instructions which implement the functions/acts specified.

The program instructions may also be loaded onto a device to cause a series of operational steps to be performed on the device to produce a device implemented process such that the instructions which execute on the device provide processes for implementing the functions/acts specified.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method comprising:
    operating one or more sensors to detect gesture input proximate to a surface of an input device of an information handling device,
    wherein the input device receives one or more input types in addition to gesture input;
    identifying a vertical distance, relative to the surface of the input device, of the gesture input;
    determining, using a processor, if the gesture input detected matches a predetermined gesture selected from a plurality of predetermined gestures, wherein each of the plurality of predetermined gestures comprises one or more vertical distance requirement characteristics relative to the surface of the input device;
    the determining further comprising identifying the predetermined gesture comprising the gesture input performed at the identified vertical distance; and
    executing at least one response action associated with the predetermined gesture being performed at the identified vertical distance,
    wherein the at least one response action associated with the predetermined gesture provided at the identified vertical distance is different from the predetermined gesture provided at a different identified vertical distance.

2. The method of claim 1, wherein the determining, if the gesture input matches a predetermined gesture is:
    determining if the gesture input matches a predetermined gesture input in a combination of layers, wherein the combination of layers are defined by proximity to the surface of the input device; or
    determining if the gesture input matches a predetermined gesture input corresponding to movement through multiple layers, wherein the multiple layers are defined by proximity to the surface of the input device.

3. The method of claim 1, further comprising detecting physical contact at the surface of the input device.

4. The method of claim 3, wherein the physical contact at the surface of the input device activates a control of the input device.

5. The method of claim 4, further comprising modifying the at least one response action associated with the predetermined gesture in response to activation of the control of the input device.

6. The method of claim 1, wherein the identifying comprises identifying an attribute of the gesture input selected from the group consisting of shape and direction.

7. The method of claim 1, wherein the surface of the input device is a keyboard, the method further comprising:
    detecting physical key input to a keyboard;
    wherein, said executing the at least one response action associated with the predetermined gesture occurs in response to detection of the physical key input and determining that the gesture input matches a predetermined gesture input.

8. A method comprising:
    operating one or more sensors to detect gesture input proximate to a surface of an input device of an information handling device,
    wherein the input device receives one or more input types in addition to gesture input;
    determining, using a processor, if the detected gesture input matches a predetermined gesture selected from a plurality of predetermined gestures input in a particular sub-region of the surface of the input device, the sub-region comprising a plurality of keys on a single planar surface of the input device and wherein the sub-region comprises a plurality of gesture layers;

and executing at least one response action associated with the predetermined gesture, wherein the at least one response action comprises an action linked to a function of the sub-region, wherein the at least one response action associated with the predetermined gesture provided at the particular gesture layer is different from the predetermined gesture provided at a different gesture layer.

9. The method of claim 8, wherein the particular sub-region of the surface of the input device is associated with a control provided using the one or more input types in addition to the gesture input.

10. The method of claim 9, wherein the particular sub-region is a number pad and the control is a numeric input.

11. The method of claim 8, wherein the executing at least one response action comprises executing at least one response action associated with the predetermined gesture provided at a particular gesture layer.

12. The method of claim 8, wherein regions of the surface are defined with respect to proximity of detected gesture input to the surface.

13. An information handling device comprising:
an input device having a surface, wherein the input device receives one or more input types in addition to gesture input; one or more sensors; one or more processors; and
a memory device that stores instructions executable by the processor to:
operate the one or more sensors to detect gesture input proximate to the surface of the input device;
identify a vertical distance, relative to the surface of the input device, of the gesture input; determine if the gesture input detected matches a predetermined gesture selected from a plurality of predetermined gestures, wherein each of the plurality of predetermined gestures comprises one or more vertical distance requirement characteristics relative to the surface of the input device;
the determining further comprising identifying the predetermined gesture comprising the gesture input performed at the identified vertical distance; and
execute at least one response action associated with the predetermined gesture being performed at the identified vertical distance,
wherein the at least one response action associated with the predetermined gesture provided at the identified vertical distance is different from the predetermined gesture provided at a different identified vertical distance.

14. The information handling device of claim 13, wherein to determine if the gesture input detected matches a predetermined gesture is:
determining if the gesture input matches a predetermined gesture input in a combination of layers, wherein the combination of layers are defined by proximity to the surface of the input device; or
determining if the gesture input matches a predetermined gesture input corresponding to movement through multiple layers, wherein the multiple layers are defined by proximity to the surface of the input device.

15. The information handling device of claim 13, wherein the instructions are further executable by the processor to detect physical contact at the surface of the input device.

16. The information handling device of claim 15, wherein the physical contact at the surface of the input device activates a control of the input device.

17. The information handling device of claim 16, wherein the instructions are further executable by the processor to modify the at least one response action associated with the predetermined gesture in response to activation of the control of the input device.

18. An information handling device comprising:
an input device having a surface, wherein the input device receives one or more input types in addition to gesture input;
one or more sensors;
one or more processors; and
a memory device that stores instructions executable by the processor to:
operate the one or more sensors to detect gesture input proximate to the surface of the input device;
determine if the gesture input detected matches a predetermined gesture selected from a plurality of predetermined gestures input in a particular sub-region of the surface of the input device, the sub-region comprising a plurality of keys on a single planar surface of the input device and wherein the sub-region comprises a plurality of gesture layers; and
execute at least one response action associated with the predetermined gesture, wherein the at least one response action comprises an action linked to a function of the sub-region,
wherein the at least one response action associated with the predetermined gesture provided at the particular gesture layer is different from the predetermined gesture provided at a different gesture layer.

19. The information handling device of claim 18, wherein regions of the surface are defined dynamically with respect to proximity of detected gesture input to the surface.

20. A non-signal storage device having computer program code embodied therewith, the computer program code being executable by the processor and comprising:
computer program code that operates one or more sensors to detect gesture input proximate to a surface of an input device of an information handling device, wherein the input device receives one or more input types in addition to gesture input;
computer program code that identifies a vertical distance, relative to the surface of the input device, of the gesture input; computer program code that determines, using a processor, if the gesture input detected matches a predetermined gesture selected from a plurality of predetermined gestures,
wherein each of the plurality of predetermined gestures comprises one or more vertical distance requirement characteristics relative to the surface of the input device;
the determining further comprising identifying the predetermined gesture comprising the gesture input performed at the identified vertical distance; and
computer program code that executes at least one response action associated with the predetermined gesture being performed at the identified vertical distance,
wherein the at least one response action associated with the predetermined gesture provided at the identified vertical distance is different from the predetermined gesture provided at a different identified vertical distance.

21. A non-signal storage device having computer program code embodied therewith, the computer program code being executable by the processor and comprising:
    computer program code that operates one or more sensors to detect gesture input proximate to a surface of an input device of an information handling device,
    wherein the input device receives one or more input types in addition to gesture input;
    computer program code that determines, using a processor, if the gesture input detected matches a predetermined gesture selected from a plurality of predetermined gestures input in a particular sub-region of the surface of the input device, the sub-region comprising a plurality of keys on a single planar surface of the input device and wherein the sub-region comprises a plurality of gesture layers; and
    computer program code that executes at least one response action associated with the predetermined gesture, wherein the at least one response action comprises an action linked to a function of the sub-region,
    wherein the at least one response action associated with the predetermined gesture provided at the particular gesture layer is different from the predetermined gesture provided at a different gesture layer.

* * * * *